May 29, 1951  H. M. THORNTON  2,554,845
METHOD OF MOLDING ARTIFICIAL TEETH
Filed April 25, 1946  4 Sheets-Sheet 1

INVENTOR.
HENRY M. THORNTON
BY
Donald W. Robertson
ATTORNEY

May 29, 1951        H. M. THORNTON        2,554,845
METHOD OF MOLDING ARTIFICIAL TEETH
Filed April 25, 1946                          4 Sheets-Sheet 2
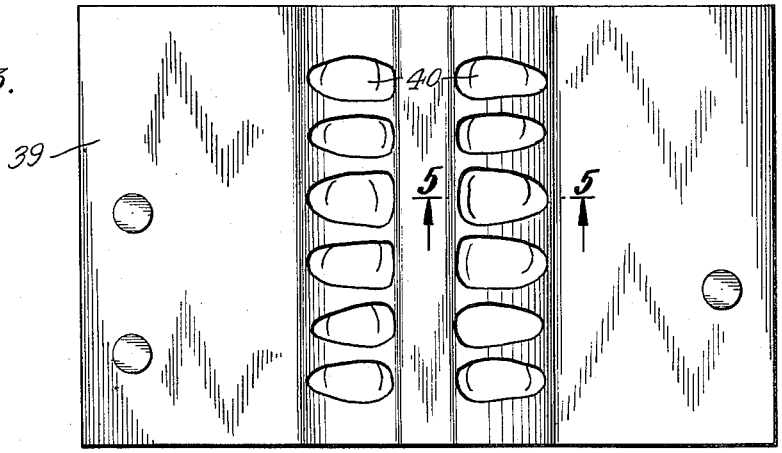
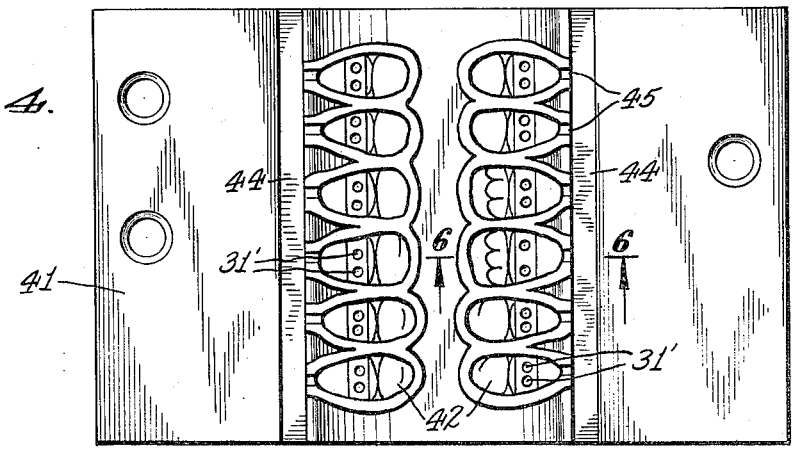
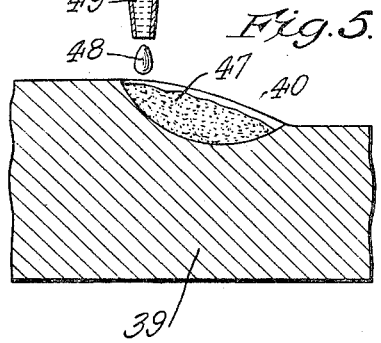
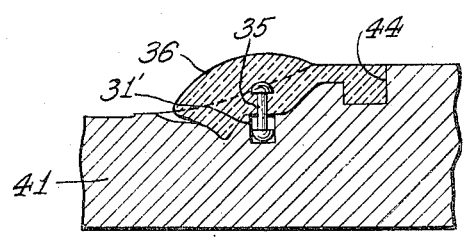
INVENTOR.
HENRY M. THORNTON
BY
Donald W. Robertson
ATTORNEY May 29, 1951  H. M. THORNTON  2,554,845
METHOD OF MOLDING ARTIFICIAL TEETH
Filed April 25, 1946  4 Sheets-Sheet 3

INVENTOR.
HENRY M. THORNTON
BY
Donald W. Robertson
ATTORNEY

May 29, 1951     H. M. THORNTON     2,554,845
METHOD OF MOLDING ARTIFICIAL TEETH
Filed April 25, 1946     4 Sheets-Sheet 4
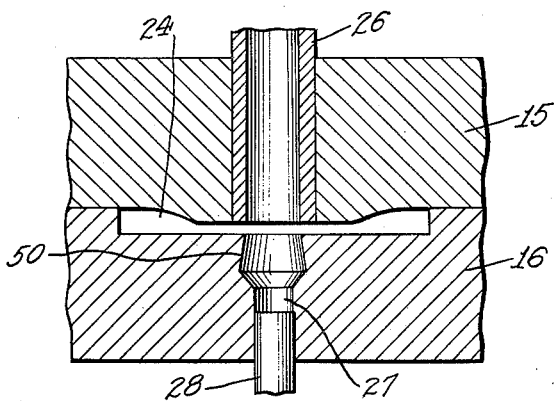
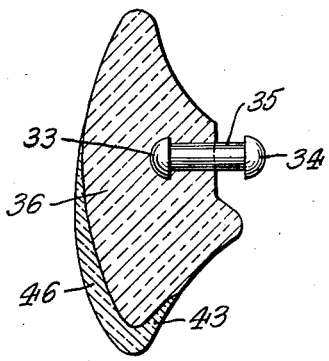
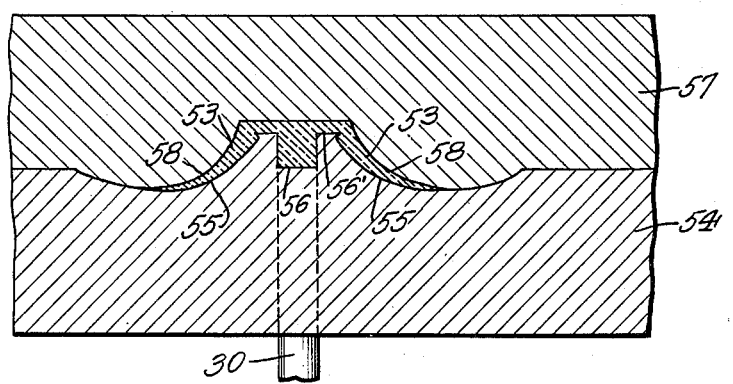
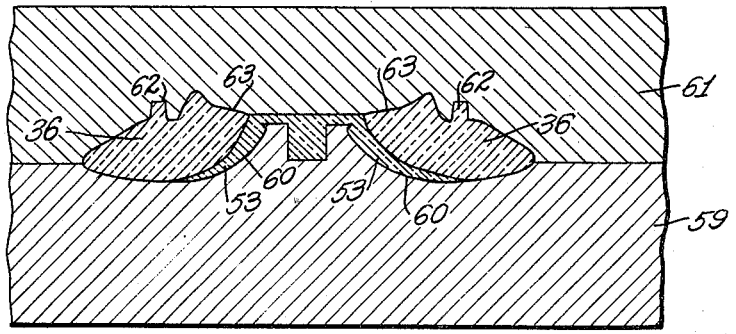
INVENTOR.
HENRY M. THORNTON
BY
Donald W. Robertson
ATTORNEY

UNITED STATES PATENT OFFICE 2,554,845

METHOD OF MOLDING ARTIFICIAL TEETH

Henry M. Thornton, York, Pa., assignor to The Dentists' Supply Company of New York, New York, N. Y., a corporation of New York Application April 25, 1946, Serial No. 664,741

6 Claims. (Cl. 18—55.1)

The invention relates to the molding of artificial teeth or other articles from synthetic resins, and to the articles so produced. It is concerned particularly with artificial teeth formed of two or more synthetic resins of different visual characteristics, and improvements in their manufacture.

In my prior patent, No. 2,345,305, granted March 28, 1944, I have disclosed a method of making artificial teeth from two synthetic resins in which the tooth body is formed first by an injection molding step, and the enamel layer constituting the incisal tip and overlying at least a portion of the body at the labial thereafter is formed by a second injection molding step. It is an object of my present invention to provide a method which is adapted to high pressure molding of the secondary layer and which will produce a more perfect bond between the body, or other first formed part, and the enamel, or other second formed part.

One method which has been devised heretofore in an attempt to secure more perfect bonding of two or more synthetic resins of different visual characteristics comprises arranging differently colored powdered plastic materials in horizontal layers in a mold feed cylinder, and then applying heat and pressure to the superimposed layers to force the plastic into the mold cavities. The plastic material at the discharge end of the feed cylinder is the first to enter the mold, and, since the gate is at the gingival end of the tooth cavity, flows to the incisal or occlusal end of the cavity. The next plastic layer in the feed cylinder follows the first layer into the mold, so that all the differently colored plastics flow into the mold in a single operation of the feeding plunger. By setting, or polymerizing, all of the plastic materials in a single stage, a satisfactory bond can be secured between the differently colored layers. However, in such a single stage molding operation the differently colored plastics are necessarily disposed in substantially horizontal layers, and there is no way of controlling the blending between the two plastics so as to form an enamel layer which overlies the body plastic at the labial. Accordingly, it is a further object of my invention to provide a molding method which is adapted to produce a two-material plastic tooth in which the blending between the body, or first-formed part, and the enamel, or second-formed part, is accurately controlled, and which at the same time creates a good bond between the body and enamel. A more specific object is to provide a method having the attributes just named, and which additionally creates a more perfect bond between the plastic materials in a tooth in which a thin layer of the enamel plastic overlies at least a portion of the body plastic at the labial.

In accordance with my invention, I first produce a part of the tooth or other article from a synthetic resin of selected visual characteristics in respect of color, degree of opacity or translucency, etc. Examples of suitable resins are the acrylics (such as methyl methacrylate), styrenes, vinyls, ureas, furfurals and allyls. I then compression mold under heat and high pressure in juxtaposition with the first-formed part a synthetic resin of visual characteristics differing from those of the first-formed part, the synthetic resin employed in this second step comprising a polymer to which a liquid monomer is added just before molding. The resins may be of either the thermosetting or thermoplastic type. The first-formed part can be made by either injection or compression molding, or otherwise, and the use of added monomer is optional. It is essential, however, that the monomer be added just prior to the second molding step, and that this second step be performed by compression molding under heat and high pressure. I have discovered, in fact, that in the molding of plastic teeth, the addition of the monomer in compression molding the second plastic to the first is the key to securing a ready bond between the two plastics, i. e. between the second plastic and a previously formed, polymerized plastic part. This makes it commercially practicable to produce teeth from a combination of two or more plastic resins differing as to type, color or translucency, and in which the different parts of the tooth can be polymerized independently, i. e. successively, so that the first-formed part, or parts, can be used as a part of the mold for accurately determining the form of the later formed part, or parts. Thus the blend between the enamel and body portions of a tooth can be accurately controlled and can be arranged so as to place the enamel-forming resin at the incisal tip or occlusal, and so that the enamel will extend over the labial face, or a portion thereof, in a thin tapering layer. This, as we have seen, is not possible of accomplishment with concurrent polymerization of two or more plastic resins introduced into a mold in immediate succession. Also, by the addition of the monomer in the sequence described, an excellent bond is obtained between the different plastics, or differently colored plastics.

The term "enamel" as used herein with reference to artificial teeth is defined as that part of the tooth which overlies the body of the tooth, forming the incisal tip and at least a part of the labial surface. It may also form a part of the lingual surface. In general, it refers to the outer layer, or coating, or veneer, of the tooth as distinguished from the main part of the tooth, which latter is herein termed the tooth "body." Thus, for example, we have in Fig. 12 the body 36 and enamel 46. "Enamel" does not signify a material, but rather the disposition of a material, or, material in terms of its disposition.

The expressions "different plastics" and "different synthetic resins" as used herein, refer to differences in the types of resins or plastics, or to differences in color, opacity or translucency, of either the same type or different types of plastics. Broadly, any difference which makes it desirable to use two or more materials in juxtaposition is comprised within the meaning of the expressions quoted. A difference in visual characteristics is enough, regardless of the existence or non-existence of a chemical difference.

I have found that in making teeth from methyl methacrylate resins according to the method I have described, pressures of between about 2000 and 6000 pounds are suitable for a 12- to 16-tooth mold. Temperatures up to around 300° Fahrenheit may be employed. These data are exemplary only, and other pressures and temperatures may be found suitable depending upon the synthetic resin employed, size or thickness of the article being molded, or other special conditions.

Artificial teeth formed in accordance with my invention comprise a plurality of synthetic resins of different visual characteristics, at least one of which is formed of a polymer and a monomer. They are characterized further by the fact that the bond between the resins (as between the enamel and body) is resistant to heat of the order of the curing temperature of acrylic denture base materials.

In order that my invention will be fully understood, I shall now describe a preferred example thereof in conjunction with the accompanying drawings illustrating one form of apparatus useful in practicing the invention. In the drawings:

Figs. 3 and 4 are face views of the compression mold parts, Fig. 3 having front, or labial, enamel forming depressions, and Fig. 4 having complementary back, or lingual, depressions to receive the previously formed bodies and to mold the lingual surfaces of the incisal tips of the teeth and that portion of the lingual enamel which may overlie the lingual aspect of the tooth bodies.

Figs. 5 and 6 are enlarged detail sectional views of a single tooth pocket in the mold parts of Figs. 3 and 4, taken as indicated at 5—5 and 6—6, respectively. To the section shown in Fig. 5 has been added a diagrammatic representation of a feeder through which liquid monomer is introduced to the labial mold cavity. To the section of Fig. 6 has been added a longitudinal sectional representation of the tooth body previously formed in the mold of Figs. 1 and 2 and transferred to the back, or lingual mold of Fig. 4.

Figure 1:
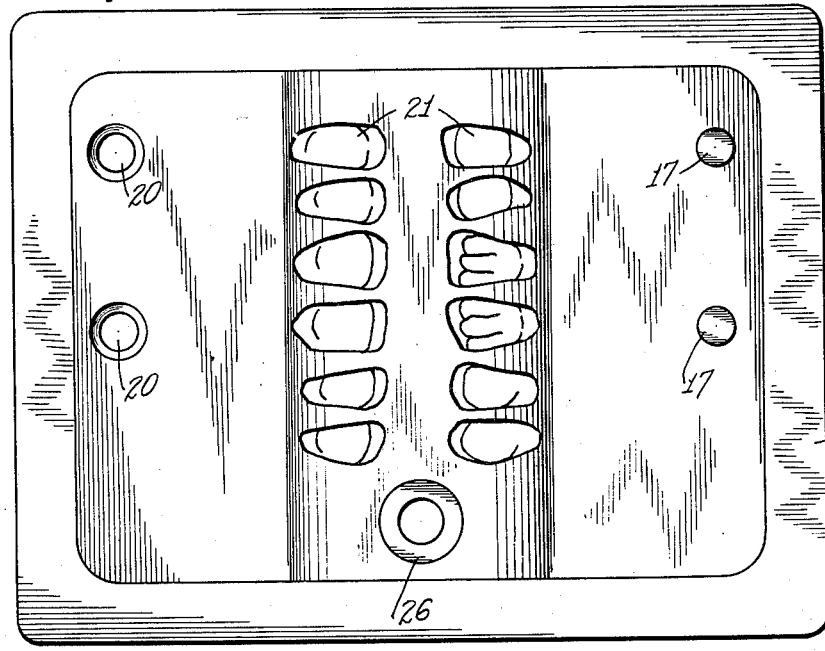
Figs. 1 and 2 are face views of the injection mold parts, Fig. 1 having front, or labial, body forming depressions, and Fig. 2 having complementary back, or lingual, body forming depressions.
Figure 2:
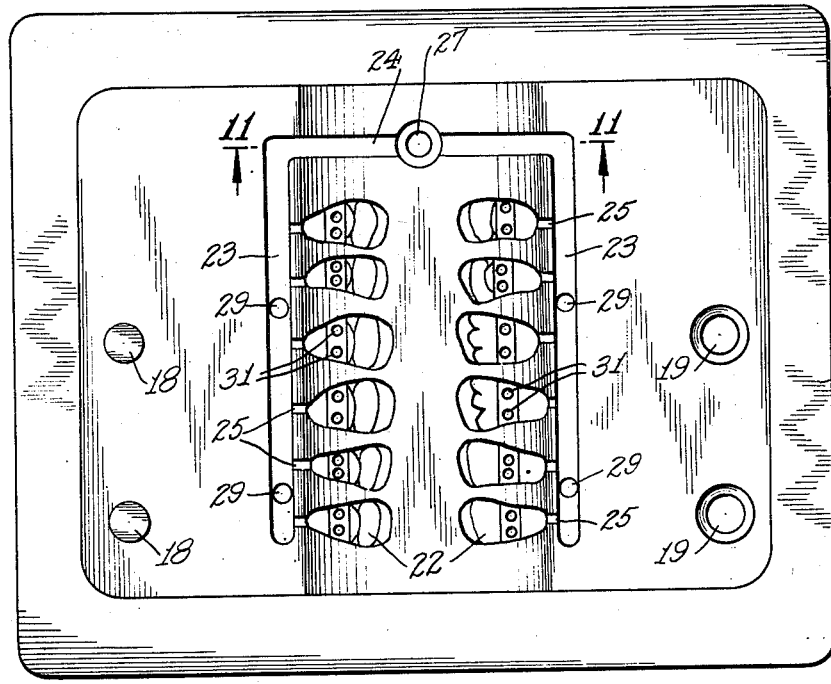
Figure 7:
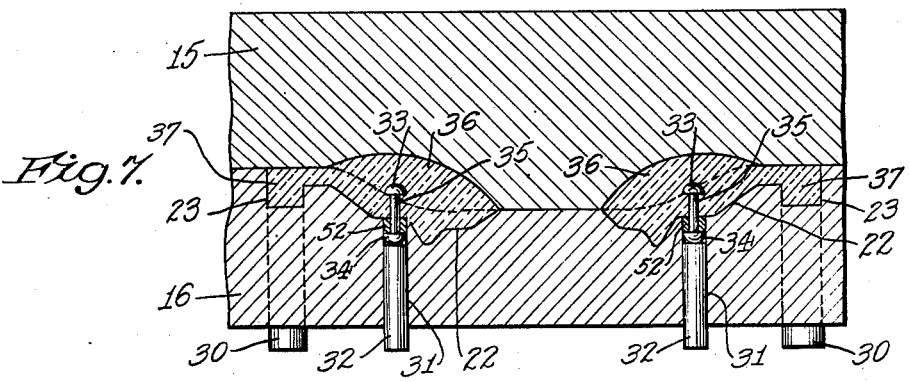

Fig. 7 is a longitudinal sectional view showing the injection mold parts of Figs. 1 and 2 in assembled relationship at the completion of the injection molding operation.

Figure 8:
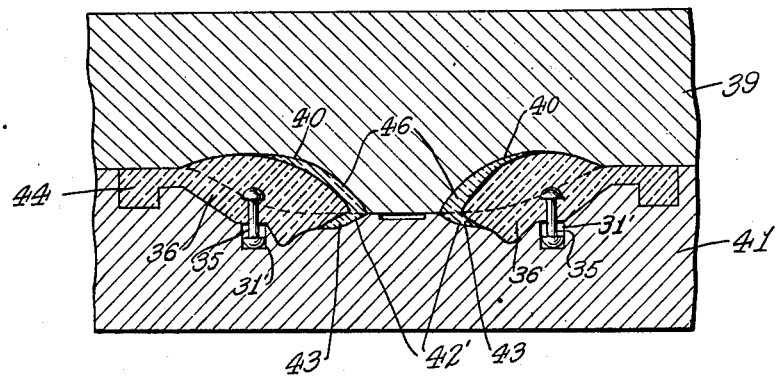

Fig. 8 is a longitudinal sectional view showing the compression mold parts of Figs. 3 and 4 in assembled relationship at the completion of the compression molding operation.

Figure 9:
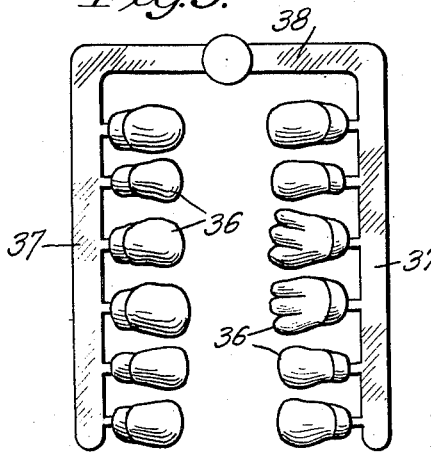

Fig. 9 is a face view of the injection casting comprising molded tooth bodies.

Figure 10:
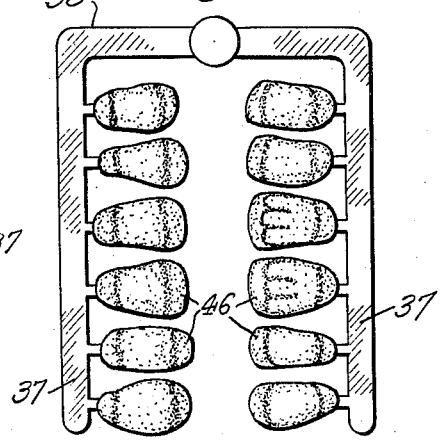

Fig. 10 is a face view of the fully molded teeth as removed from the compression mold.

Fig. 11 is a sectional view with the injection mold parts of Figs. 1 and 2 engaged, taken along the line 11—11 of Fig. 2.

Fig. 12 is an enlarged detail longitudinal sectional view of a completed tooth manufactured in accordance with my invention.

Figs. 13 and 14 are longitudinal sectional views similar to Figs. 7 and 8, illustrating a modified mold construction and method in which the enamel, or veneer, part of the teeth is first formed by injection molding, and the body part thereafter formed by compression molding with the use of a liquid monomer according to my invention. Fig. 13 shows the injection mold parts engaged at the completion of the injection molding operation. Fig. 14 shows the compression mold parts engaged at the completion of the compression molding operation.

The complementary injection mold parts 15, 16 of Figs. 1 and 2 are adapted to be used in conjunction with an injection molding machine of suitable construction such, for example, as that shown and described in my prior Patent No. 2,345,305 aforesaid (see Fig. 6 of that patent and the description thereof). Dowel posts 17, 18 and complementary holes 19, 20 respectively, provide means for bringing the mold parts 15, 16 into proper registry. Mold part 15 has front, or labial, body forming depressions 21. In a single tooth mold there would be a single depression, but in the mold illustrated there are 12 depressions designed to mold the labial side of the tooth bodies for 12 anterior teeth. Mold part 16 has complementary back, or lingual, body forming depressions 22. Grooves 23 in the face of this mold part provide runners for delivering the fluid plastic from the feeder 24 to the gates 25 leading to the gingival ends of the tooth depressions. Feeder 24 is in communication with nozzle 26 of the injection machine, the end of which may terminate at the face of the mold part 15.

For convenience of reference, mold part, 15, which forms the labial aspect of the body portions of the teeth, will be termed herein the "body shader." Mold part 16 will be referred to as the "back mold."

The back mold 16 is provided with a hole 27 in line with the nozzle 26 to receive the knock-out pin 28 (Fig. 11), and with holes 29 (Fig. 2) communicating with the grooves 23 to receive the knock-out pins 30 (Fig. 7). Also the back mold is provided with a pair of holes 31 in line with the pin shelf portion of each of the depressions 22 to receive knock-out pins 32 (Fig. 7).

When the teeth are of the "pin" type, i. e. when they are to be provided with pin fastenings for anchoring the teeth in a denture base, pins 35 having heads 33, 34 are inserted into the tops of holes 31, where they rest on the upper ends of knock-out pins 32 so that these fastening pins will be embedded in the tooth body during the injection molding operation. Wax 52 may be flowed around the pins 35 to hold them in place and prevent the plastic tooth material from entering the spaces between the pins and the holes 31 in the mold. At the conclusion of the molding operation the wax is removed as by means of a suitable solvent.

When the teeth are made of thermoplastic resins and are to be used with an acrylic denture base material no fastening pins or other special anchorage need be provided. In this case the pins 35 can be omitted. However, where the materials of the denture base and teeth are not compatible, a mechanical anchorage must be provided. This anchorage can be provided by means of the pins 35 or by known diatoric constructions.

With the knock-out pins in the position shown in Fig. 7, and the pins 35 in place as also shown in this view, the body shaper 15 and back 16 of the injection mold are clamped in mating engagement and a synthetic resin of selected visual characteristics is injected into the mold under relatively high pressure, a pressure of 30,000 pounds per square inch being suitable.

At the conclusion of the injection molding step, the plastic material extending from the nozzle 26 to the feeder 24 is extracted from the nozzle by undercut 50 in mold part 16. The resultant injection casting, comprising molded tooth bodies 36 and attached sprue 37, 38, is illustrated in Fig. 9.

Figs. 3 and 4 show the front and back mold parts for the compression molding step. Front mold part 39 has front, or labial, enamel-forming depressions 40, and back mold part 41 has complementary back, or lingual, depressions 42 to receive the previously formed bodies 36 (Fig. 6) and to mold the lingual surfaces 42' of the incisal tips of the teeth and that portion of the lingual enamel which may overlie the lingual aspect of the tooth bodies as at 43 (Fig. 8). Grooves 44 and adjoining grooves 45 in the back mold 41 are constructed and arranged to receive the sprue attached to the injection casting, and recesses 31' are provided to accommodate the heads of fastening pins 35 if used. The width of the compression mold preferably is such that the feeder portion 38 of the injection casting sprue lies outside of the mold when the injection casting has been assembled therewith. Thus the injection casting of Fig. 9 is adapted to be received within the compression mold as indicated in Figs. 6 and 8. The enamel part 46 of the tooth is molded of a different plastic than the body. (See the definition of "different plastics" given hereinabove.) With the previously formed body portions 36 positioned in the depressions 42 of the back part of the compression mold, enamel plastic is placed in each of the depressions 40 of the front part of the compression mold. This step is illustrated in Figs. 3 and 5 in which 47 represents the polymer of the enamel plastic. When the enamel plastic is a thermoplastic resin, this polymer may be in powdered form. When the enamel plastic is a thermosetting resin, it may be in a semi-liquid form. Just before molding the enamel part of the tooth, a liquid monomer 48 is added to the polymer as by means of a nozzle or series of nozzles or droppers 49 indicated diagrammatically in Fig. 5. Thereafter the front mold 39 is inverted and brought into mating engagement with the back mold part 41, the engaged parts being placed in a heater press to mold the enamel plastic to the body plastic under heat and high pressure. During the compression molding step the gummy or oily slip formed by the mixture of polymer and monomer is distributed so as to fill the spaces between the depressions in the two mold parts and the previously molded tooth bodies, as indicated at 43, 46 in Fig. 8. The final casting resulting from the compression molding operation is illustrated in Fig. 10. The teeth are severed from the sprue, and any remaining fins or projecting gate portions are smoothed off by grinding and buffing, or otherwise.

If it should be desired to form the enamel part of the tooth first, and thereafter form the body part by compression molding to the enamel part a synthetic resin comprising a polymer seasoned with a monomer, this may be done without departing from the essential principles of my invention. To illustrate further this modification of my invention, I have shown in Fig. 13 an injection mold for forming the enamel portions 53 of the teeth. Front mold part 54 has depressions 55 for forming the labial surface of the enamel, and grooves 56, 56' forming a runner and gates for feeding the enamel plastic material to the mold cavities. Enamel shader part 57 of the mold has complementary lingual enamel forming bosses 58.

Fig. 14 shows a compression mold for performing the second step of my modified process, i. e. molding the body plastic material to the previously formed enamel parts of the tooth. Front mold 59 has depressions 60 to receive the previously formed enamel parts 53, and also has grooves to receive the attached sprue. Back mold part 61 has depressions 63 for forming the back or lingual part of the tooth body 36, and may also have recesses at the pin shelf portion of the depressions to form anchoring projections 62. After the enamel parts 53 with the attached sprue have been transferred from the injection mold 54, 57 to the front mold 59 of the compression mold, a plastic polymer for the body is placed in the depressions 63 of the back mold 61 and seasoned with a monomer just before the mold parts 59, 61 are brought into mating engagement for compression molding.

Other possible modifications will suggest themselves to those familiar with the molding of plastics or the manufacture of artificial teeth. The terms and expressions which I have employed are used in a descriptive and not a limiting sense, and I have no intention of excluding such equivalents of the invention described, or of portions thereof, as fall within the purview of the claims.

I claim:

1. The method of forming artificial teeth from synthetic resins which comprises first molding a tooth part from a synthetic resin of selected visual characteristics, adding a monomer to a polymeric synthetic resin of visual characteristics differing from those of the first molded part, and thereafter molding said polymeric resin in juxtaposition with said first molded part.

2. The method of forming artificial teeth from synthetic resins which comprises first producing a tooth part by injection molding a synthetic resin of selected visual characteristics, adding a monomer to a polymeric synthetic resin of visual characteristics differing from those of the first molded part, and thereafter molding said polymeric resin by compression in juxtaposition with said first molded part.

3. The method of forming artificial teeth from synthetic resins which comprises first molding a tooth part from a synthetic resin of selected visual characteristics, adding a liquid monomer to a polymeric synthetic resin of visual characteristics differing from those of the first molded part, and thereafter molding said polymeric resin in juxtaposition with said first molded part.

4. The method of forming artificial teeth from synthetic resins which comprises first molding the tooth body from a synthetic resin, adding a monomer to a polymeric synthetic resin, and thereafter molding said polymeric resin in juxtaposition to said molded body to provide thereon an incisal tip and an enamel layer overlying at least a portion of said body.

5. The method of forming artificial teeth from synthetic resins which comprises first molding the tooth body from a synthetic resin of selected visual characteristics, adding a liquid monomer to a polymeric synthetic resin of visual characteristics differing from those of the body resin, and thereafter molding said polymeric resin in juxtaposition to said molded body to provide thereon an incisal tip and an enamel layer overlying at least a portion of said body.

6. The method of forming artificial teeth from synthetic resins which comprises first molding a tooth part from a synthetic resin of selected visual characteristics, preparing in a mold a polymeric synthetic resin of differing visual characteristics, adding a liquid monomer to said polymeric resin while in said mold, and thereafter molding said polymeric resin in juxtaposition to said molded tooth part.

HENRY M. THORNTON.

REFERENCES CITED

The following references are of record in the file of this patent:

UNITED STATES PATENTS

| Number | Name | Date |
|---|---|---|
| 1,547,643 | Clapp | July 28, 1925 |
| 1,745,570 | Dimelow | Feb. 4, 1930 |
| 2,234,993 | Vernon et al. | Mar. 18, 1941 |
| 2,345,305 | Thornton | Mar. 28, 1944 |
| 2,380,468 | Saffir | July 31, 1945 |